Figure 1:
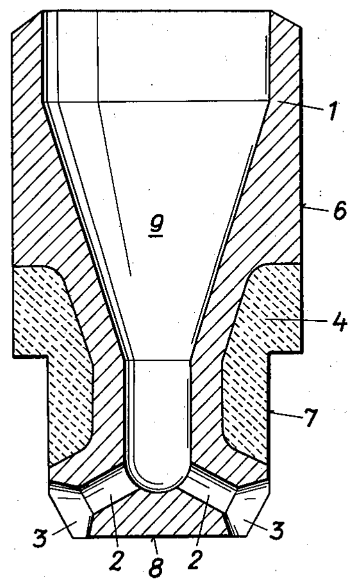

Jan. 24, 1961 J. GREIER ET AL 2,969,050

PRECOMBUSTION CHAMBER OF FUEL INJECTION ENGINES

Filed March 6, 1959

INVENTOR.
Josef Greier and
Bruno Schukoff
BY
Watson, Cole, Grindle &
Watson, attorneys United States Patent Office 2,969,050

Patented Jan. 24, 1961

2,969,050

PRECOMBUSTION CHAMBER OF FUEL INJECTION ENGINES

Josef Greier and Bruno Schukoff, Graz, Austria, assignors to Hans List, Graz, Austria Filed Mar. 6, 1959, Ser. No. 797,763

Claims priority, application Austria Mar. 7, 1958

3 Claims. (Cl. 123—32)

Since the chamber of a precombustion engine, and in particular its tapered end containing the exhaust ducts connecting the precombustion chamber with the interior of the cylinder, which largely determines the serviceability of the whole unit, is subject to the highest thermal stress, it will be realized that this part requires positive cooling.

For obvious reasons—the precombustion chamber being located at a certain distance from the path of the scavenging air and coming into contact with the air of combustion only after the latter has also been substantially preheated as a result of its compression in the cylinder—evacuation of the chamber heat by convection using the contents of the cylinder will not be practicable. Consequently, the transference of heat will be possible only in the walls of the precombustion chamber towards the elements of the cylinder head enclosing the latter. As the precombustion chamber is subject to extreme thermal stress, it should be made of materials which are highly refractory but of poor heat-conductivity.

It is the purpose of the invention to improve the cooling of the antechamber tapered end in particular. This is achieved primarily by an increase of the cross-section available for heat conduction by providing for greater thickness of the precombustion chamber material in the area of the chamber tapered end consisting of refractory material. On the other hand, any increase in wall thickness in the area of the exhaust ducts must not be allowed to augment the loss of flow due to the greater length of the exhaust ducts. That part of these losses which results from the throttling of the flow in the narrow ducts is essentially dependent upon the length of the exhaust ducts of constant cross section which the gas emerging from the cylinders has to pass. Therefore, any increase of the wall thickness can produce a satisfactory overall result only if the length of the exhaust ducts responsible for losses through throttling can be left substantially unchanged.

It has already been known to cut off the precombustion chamber at the cylinder end along a plane inclined in relation to the longitudinal axis of the antechamber and perpendicular to the axis of the exhaust duct with a view to shortening an exhaust duct. However, this particular design involves contraction of the chamber wall, which is in effect contrary to the required heat conduction.

In contradistinction to this design, the invention fully maintains the reinforcement of the chamber wall in the area of the exhaust ducts and avoids any contraction whatever. To achieve the desired effect, the ducts are outwardly defined by widening chamfers of the chambers. However, the increase in thickness of the material provides a cross-section available for heat conduction which compensates for the diminished heat conductivity of the refractory material.

Another feature of the invention relates to the transference of heat between the chamber and the cylinder head. For that purpose, the section of the chamber which is heat-conductingly connected with the cylinder head is externally coated with a material of particularly high heat-conductivity. In order to improve the transference of heat, this material must obviously be applied to the refractory portion of the chamber without any joints. This can be done by a number of known processes, such as spraying, welding, etc. It has already been suggested before to provide a bushing of a heat-conducting material between the chamber and the cylinder head so as to surround the chamber jacket-fashion, exposing only the portions subject to maximum thermal stress, such as the ports of the exhaust ducts and the front surface of the precombustion chamber. However, this will not produce satisfactory heat conduction because under all operating conditions an air gap should exist between the chamber and the inner surface of said bushing, the heat being therefore, evacuated only through the annular front surface of the bushing. In contrast to this design, according to the invention material of good heat conductivity is applied to the wall of the precombustion chamber with the avoidance of joints between the chamber and the jacket layer on the one hand, and the chamber is inserted in the cylinder head precisely in the area of the surface layer with a minimum clearance on the other hand.

Further details of the invention will appear from the following description of an embodiment of the invention with reference to the accompanying drawing in which Figure 1 shows a longitudinal section.

Figure 2:
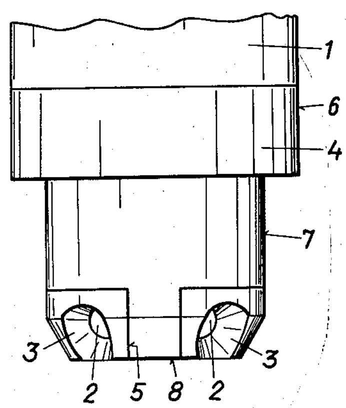

Figure 2 is an elevation of a precombustion chamber according to the invention.

The main portion 1 of the precombustion chamber which consists of highly refractory material comprises exhaust ducts 2 at its tapered end, connecting the antechamber 9 with the interior of the cylinder. In order to keep the exhaust ducts short enough to diminish loss through throttling in spite of the considerable thickness of the chamber material called for by the necessity of conducting the heat from the chamber tapered end to the cylinder head, the ducts open into funnel-shaped chamfers 3 at the outer surface of the chamber.

For the purpose of further improving the transference of heat from the precombustion chamber into the cylinder head, the surfaces 6 and 7 of the chamber alongside which it is heat-conductingly seated in the cylinder head, are coated with a layer or jacket 4 of a material of particularly high heat-conductivity, such as copper, aluminum, nickel, silver and the like. This layer encompasses the precombustion chamber jacket-fashion leaving the parts subject to maximum thermal stress, such as the edges of the exhaust ports and the front surface 8 of the chamber tapered end exposed. For the purpose of improving the conduction or dissipation, in the embodiment illustrated, grooves 5 extending towards the front surface 8 are provided between the apertures 3 and likewise filled with the material of the jacket 4, thus forming portions of high heat conductivity which constitute integral extensions of the jacket 4.

The jacket 4 can be applied by any known process provided the requirement of jointless metallic surface coating is met.

We claim:

1. A precombustion insert for combustion engines, said insert comprising a main body of high refractory material defining a chamber opening through one end thereof, said chamber being tapered toward the other end of said main body, the said main body being further formed with a plurality of exhaust ducts opening outwardly therethrough from the converging end portion of said chamber, said main body being formed with grooves extending between respective adjoining pairs of said ducts and including portions of high heat conductivity completely occupying said respective grooves in intimate heat conducting relation with said main body.

2. A precombustion chamber insert for precombustion engines, said insert comprising a main body of high refractory material defining a chamber opening through one end thereof, said chamber being tapered toward the other end of said main body, said main body being formed with a plurality of ducts opening outwardly therethrough from the converging end portion of said chamber, said main body being encircled medially between its opposite ends and closely adjacent said ducts by a recess, a jacket of material of high heat conductivity occupying said recess and in intimate heat relation with said main body, said main body being formed externally with grooves extending between adjoining pairs of said ducts from said recess, and said jacket including integral extension portions completely occupying said grooves in intimate heat conducting relation with said body.

3. An insert for precombustion engines as defined in claim 2, wherein the upper end portions of the respective ducts are of outwardly flared generally conical configuration from a point generally medially of the length of each said duct, the remainder of each said duct being of substantially uniform cross-section, the said flared end portions reducing the space between pairs of adjoining said ducts and thus reducing the heat conductivity of material lying between each adjoining pair of said ducts, said portions of high heat conductivity extending between said pairs of ducts and serving to compensate for said reduction.

References Cited in the file of this patent

FOREIGN PATENTS

| | | |
|---|---|---|
| 504,550 | Italy | Dec. 13, 1954 |
| 773,278 | Great Britain | Apr. 24, 1957 |